PATENTED JUN29 1971
3,589,200
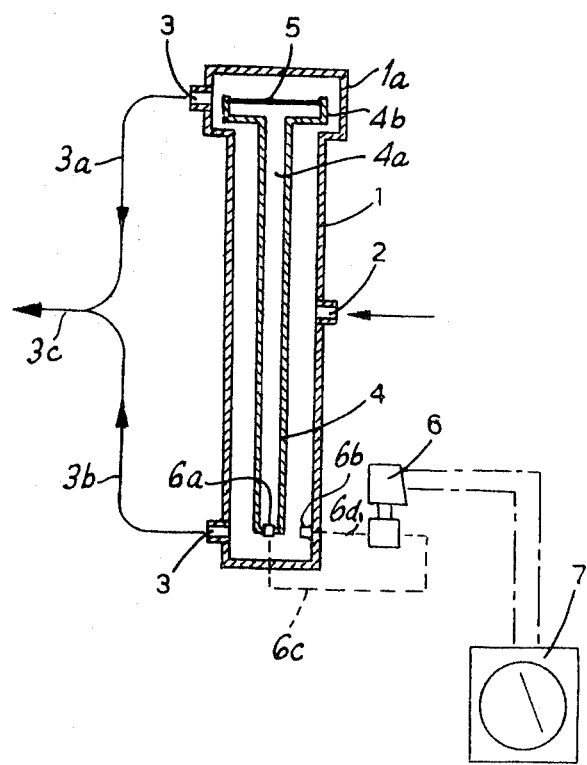
INVENTOR.
VILGOT RAYMOND NILSSON
BY
Davis, Hoxie, Faithfull & Hapgood
ATTORNEYS

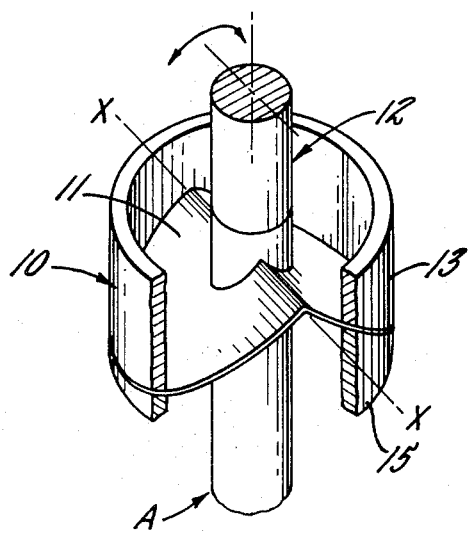
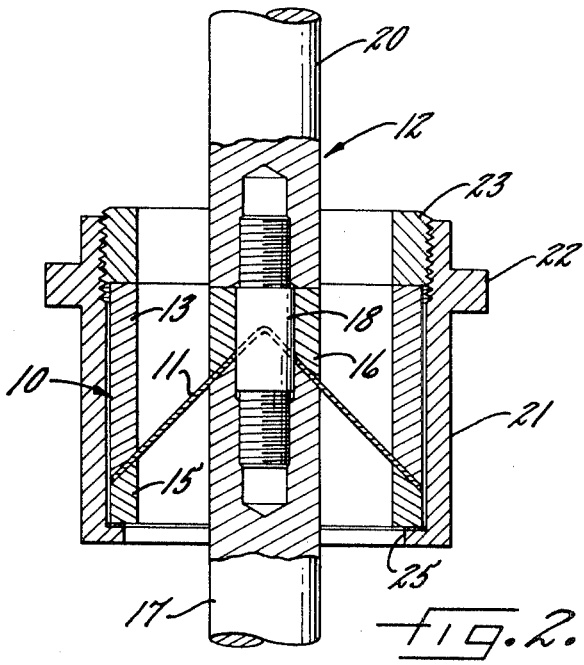
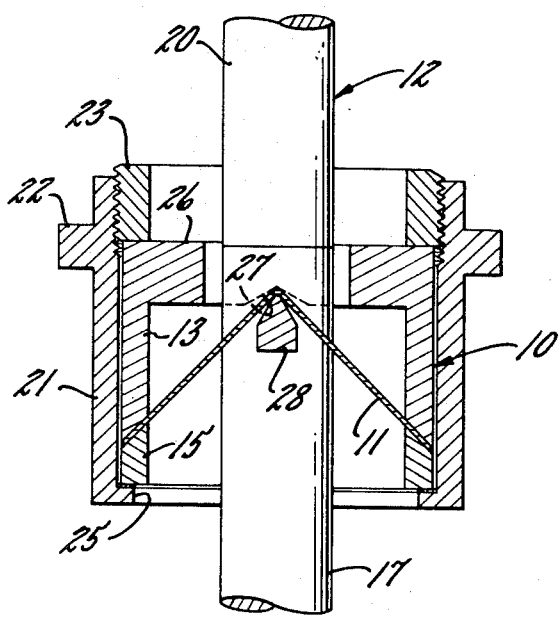
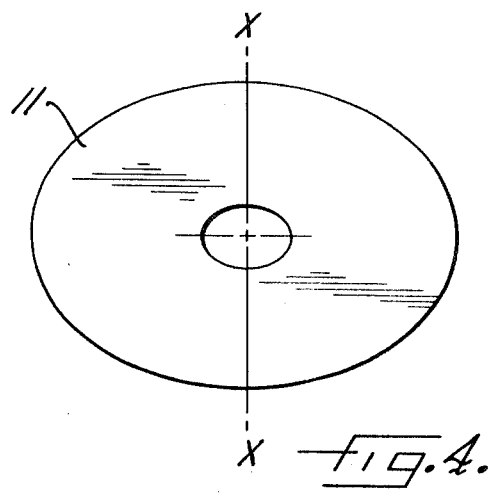
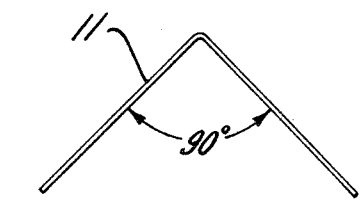
INVENTOR.
GERALD F. OSTROOT,
BY Wolfe, Hubbard, Voit & Osann
ATTORNEYS.

DIAPHRAGM PIVOT SEAL

DESCRIPTION OF THE INVENTION

This invention relates to diaphragm seals and in its principal aspect concerns a diaphragm seal having an integral pivot axis to support a pivoted beam member against linear displacement.

A principal object of the present invention is to provide an improved diaphragm pivot seal which positively seals against leakage from a closed pressurized environment while providing free flexing of a pivoted beam member about its pivot axis.

It is further intended to provide an improved seal of the above description in which the diaphragm and pivot structure occupies a minimum of space with no protruding braces or other structure extending beyond the wall of the conduit in which the seal is installed. The pivot axis of the improved seal is defined by the diaphragm member itself with the pivoted beam being positively constrained for movement in only a single plane of rotation.

A more detailed object is to provide a diaphragm seal as described above which may be easily and simply reinforced to withstand greater pressure differentials without sacrificing ease of construction or compactness of design.

In addition to the above it is intended that the improved seal of the invention employ a unitary diaphragm constructed of flat sheet material without the need for compound curvatures, stiffening ribs or other such structure.

Other objects and advantages of the invention will become apparent upon referring to the following detailed description and upon reference to the drawings, in which:

FIG. 1 is a perspective in partial broken section showing a diaphragm pivot seal exemplifying the present invention;

FIG. 2 is a side elevation in section of the seal of FIG. 1, shown mounted within a receptacle for installation in a conduit wall;

FIG. 3 is a modification of the structure shown in FIG. 2 in which certain strengthening elements are incorporated;

FIG. 4 is a projected plan view of the sheet material diaphragm, prior to folding, utilized in the seals of the preceding figures; and FIG. 5 is a side elevation of the diaphragm of FIG. 4, as creased or folded for installation.

While the present invention is illustrated in connection with certain preferred embodiments, it will be understood that the invention is not limited to the particular constructions and applications shown, but on the contrary is useful in all seal applications where a compact, strong and reliable diaphragm seal is required for a pivoted shaft or beam member.

Turning to the drawings, FIG. 1 illustrates in perspective a diaphragm seal unit exemplifying the present invention. Within a body member 10 is a passage or bore to which a flexible sheet material diaphragm 11 is joined. At the center of the diaphragm 11 is carried a pivoted beam member 12. This structure is usable, for example, in a flow measuring device where it could be installed with the central axis of the body 10 being vertical to the direction of flow within a pressurized conduit. Fluid pressure on a sensing blade or the like (not shown) would cause a force to be exerted on the beam member 12 at point A (FIG. 1), causing the beam 12 to rotate about a pivot axis X–X and exert a corresponding force against an exteriorly mounted measuring device (not shown).

The diaphragm 11 is retained in the body member 10 by constructing the latter from two interfitting sections 13, 15 which meet to form a slot in the shape of an inverted V as seen in FIG. 2. Both members 13, 15 can be machined on conventional milling equipment, or cut from tube stock with a saw. Alternatively, the body 10 may be formed from a unitary cylindrical member and the folded diaphragm 11 welded to its interior surface.

As a principal feature of the invention, the beam pivot axis X–X (FIG. 1) is defined by the diaphragm 11 itself, without the need for external braces or restraining members of any kind. This is achieved by constructing the diaphragm 11 from a single piece of flat sheet material and bending or creasing it about a fold line which is coincident with the intended pivot axis X–X. The diaphragm 11 is thereby comprised of two planar portions which slope inwardly at equal angles to the central axis of the body 10 to meet along a fold line which forms a transverse ridge substantially bisecting the bore within the body 10.

As another feature of the invention, the diaphragm 11 is desirably made in a simple elliptical shape, with the pivot axis X–X being formed at the fold line and bisecting the ellipse at its minor axis (FIG. 4). The diaphragm 11 may be bent at its fold line with each portion being at 45° to the bore axis to define an included angle of 90° (FIG. 5), and if the ratio of the ellipse minor axis to the major axis is 1.414 it will mate accurately with cylindrical body member elements 13, 15. These elements may be welded together or secured by any other suitable fastening means.

Further in accordance with the invention, the beam 12 is similarly constituted with interfitting portions consisting of an upper adapter 16 and a lower shaft 17 joined together by a concentrically located threaded stud 18. For ease of assembly, the stud 18 is first seated within the lower beam member 17. This structure is then slipped into engagement with the diaphragm 11 through a hole provided in the diaphragm for this purpose and the upper adapter 16 is slipped over the protruding end of the stud 18. An upper shaft extension 20 is then simply threaded onto the stud 18 to complete the beam assembly. The diaphragm 11 may be welded to either or both of the beam members 16, 17 as required.

The invention further provides for installation of the seal assembly as a capsule, with the receptacle member 21 having a flange 22 for attachment to an opening in the wall member of a conduit (not shown). With the receptacle 21 thus installed, as for example by welding the flange 22 to the wall of the conduit, the seal assembly may be easily installed or replaced by providing a threaded retaining means such as a collar 23. At the bottom of the receptacle 21 an inturned annular flange 25 holds the seal assembly in place.

In applications where a substantial pressure differential exists between a high-pressure area on the inside of a conduit and a low-pressure area exterior of the conduit, the invention provides for a simple and effective diaphragm reinforcing structure as shown in FIG. 3. In this embodiment, the body 10 includes additional reinforcing structure in the form of an annular support flange 26 in supportive contact with the outside of the fold or crease of the diaphragm 11. The supporting flange 26 is preferably circular, surrounding the beam 12 but being spaced from it so as not to interfere with pivoting movement about the pivot axis. On either side of the beam 12 along the pivot axis and facing the fold of the diaphragm 11, the support flange 26 is provided with a linear V-notch 27 having an included angle greater than that of the fold in the diaphragm 11 so that the diaphragm may flex slightly within the notch 27 while still being completely supported along the outside of the fold on a line of contact extending from the wall of the body 10 nearly to the point where the diaphragm 11 joins the beam 12.

Complementing the foregoing support flange 26 is a transverse knife-edged shoulder member 28 carried by the beam 12 and extending transversely for rocking engagement along the fold line of the diaphragm 11 opposite the support flange 26. The apex of the knife-edged support 28 also has an included angle less than the fold angle of the diaphragm 11 to allow for freedom of movement. As a result, substantially larger pressure differentials may be resisted by the seal structure shown in FIG. 3 with a major portion of the pressure forces being absorbed by pivotable engagement between the support flange 26 and shoulder member 28, leaving the beam 12 relatively free of pressure forces for unimpeded movement about the pivot axis defined by the fold line of diaphragm 11.

I claim:

1. A diaphragm pivot seal comprising, in combination a body member having an internal passage extending therethrough defining a body wall surrounding said passage, a flexible sheet material diaphragm joined to the body wall, said diaphragm including two planar portions angularly disposed from the axis of said passage at substantially a 45° angle and intersecting at a transverse fold line, and a beam member passing through said passage and supported by the diaphragm for pivotal movement on a pivot axis defined by said transverse fold line.

2. Apparatus as defined in claim 1 in which said internal passage is of circular cross section with the planar portions of the diaphragm defining a surface in the form of an ellipse which has been folded at its minor axis such that a projection of the diaphragm parallel to the axis of said passage defines a circle.

3. In a wall member separating a region of higher pressure from a region of lower pressure, apparatus as defined in claim 1 in which the diaphragm is oriented with the fold line disposed toward the region of lower pressure.

4. A reinforced diaphragm pivot seal including apparatus as defined in claim 1, having a support carried by the body member within the passage in supportive contact with the diaphragm at the fold line, and having a transverse knife-edge support carried by the beam in rocking engagement with the diaphragm fold line opposite the support structure.

5. Apparatus as defined in claim 4 in which the support has a V-notch at the point of contact with the diaphragm fold line, with the V-notch angle being greater than the diaphragm fold angle and the beam support knife-edge angle being smaller than the diaphragm fold angle.

6. A diaphragm pivot seal assembly comprising, in combination, a conduit wall having an opening surrounded by a receptacle, a diaphragm seal as defined in claim 1 carried within the receptacle, and threaded fastener means for securing the diaphragm seal within the receptacle.

7. Apparatus as defined in claim 2 in which the body member is comprised of two interfitting sections defining a V-slot at their intersection, and in which the diaphragm is carried within said slot.

8. Apparatus as defined in claim 2 in which the beam is comprised of interfitting sections defining a V-slot at their intersection, and in which the diaphragm is carried within said slot.

9. Apparatus as defined in claim 8 in which the beam is a cylindrical shaft structure with the interfitting sections being joined by a central threaded stud protruding through a corresponding opening in the diaphragm.